(No Model.)
R. ELLIN.
PROCESS OF PRESERVING MILK.
No. 349,574. Patented Sept. 21, 1886.
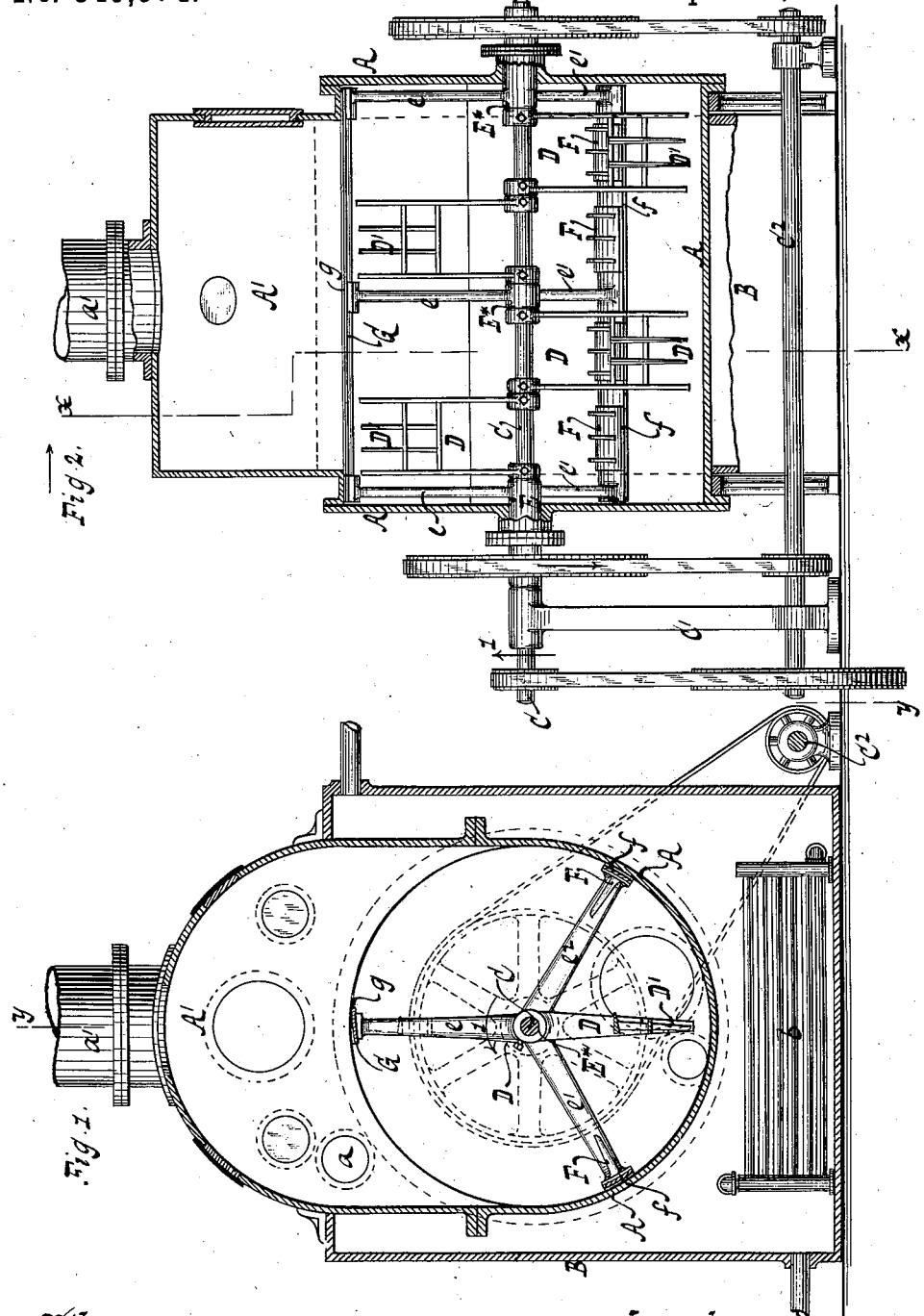
Witnesses
William Miller
A. Faber du Faur
Inventor
Robert Ellin
by Van Santvoord & Hauff
his attorneys

UNITED STATES PATENT OFFICE.

ROBERT ELLIN, OF YONKERS, NEW YORK.

PROCESS OF PRESERVING MILK.

SPECIFICATION forming part of Letters Patent No. 349,574, dated September 21, 1886.

Application filed June 10, 1886. Serial No. 204,756. (No model.)

*To all whom it may concern:*

Be it known that I, ROBERT ELLIN, a citizen of the United States, residing at Yonkers, in the county of Westchester and State of New York, have invented new and useful Improvements in Preserving Milk, of which the following is a specification.

This invention consists in a new process for producing a dry granulated powder composed of milk and sugar by first mixing the milk with cane-sugar in suitable proportions, and then evaporating the mixture to dryness at a temperature below 140° Fahrenheit under constant agitation and comminution.
The apparatus which I prefer to use in carrying out my invention is illustrated in the accompanying drawings, in which—

Figure 1 represents a transverse vertical section in the plane $x\,x$, Fig. 2. Fig. 2 is a longitudinal vertical section in the plane $y\,y$, Fig. 1.

Similar letters indicate corresponding parts.

I take fresh milk and mix the same with cane-sugar, in the proportion of about one pound of sugar to each gallon of milk, and to this mixture may also be added a small quantity of glycerine, in the proportion of one or two drops of glycerine to each gallon of milk, and then I introduce this mixture into a vacuum-pan which is provided with a stirrer and with scrapers and knives, and in which a vacuum of twenty-six to twenty-nine inches of mercury is maintained. The vacuum-pan is heated by means of a water bath or otherwise, so as to keep the contents at a temperature of from 90° to 130° Fahrenheit, and at the same time the agitators, scrapers, and knives are kept in motion, so that the mixture is prevented from adhering to the inside walls of the vacuum-pan and from forming into lumps. After the lapse of several hours (more or less, according to the quantity of liquid in the pan) the mixture has become reduced to a coarse dry powder which contains all the properties of fresh milk, and which is ready for the market.

In the drawings, the letter A designates a container to receive the fluid to be evaporated. The container is provided with a dome, A', extending almost the entire length of the container, and having a feed-opening, $a$, and a number of glass windows, so that the interior of the container can be inspected from without. The dome A' furnishes a space for the distillation to take place, so that the liquid evaporates rapidly. The distilled liquid is led from the dome by an exit-pipe, $a'$, to which an air-pump is connected. The container is surrounded by a hot-air chamber, B, which contains a series of steam pipes or radiators, $b$, and is provided with an inlet and an outlet pipe for the air. The air flowing through the chamber is held at a constant temperature, (below 140° Fahrenheit for milk,) so that the container cannot become overheated. Instead of an air-chamber, a water-jacket or other well-known means can be used to prevent an excessive temperature.

In the evaporation of milk to reduce the same to a dry powder, as well as in the evaporation in general, it is very necessary to provide means to keep the mass constantly agitated, and also free the same from the walls of the container to prevent charring.

Through the container A extends a shaft, C, which is provided with bearings in the container and in a standard, C'. A rotary motion in the direction of arrow 1 is imparted to the shaft by means of a belt-and-pulley connection with a counter-shaft, $C^2$. On the shaft C are secured a series of cutters or blades, D', having their keen edges facing in the direction of rotation of the frame. These series of cutters or blades extend throughout the length of the container and revolve in the same.

Upon the shaft C is loosely fitted a sleeve, E, Fig. 2, which extends into the container, and carries a number of radiating arms, $e\,e'\,e^2$, and at proper intervals in the length of the shaft are loosely fitted additional sleeves, $E^*$, said sleeves carrying corresponding arms $e\,e'\,e^2$. To the arms $e\,e'$ of each sleeve are attached long and narrow plates $f$, which extend throughout the length of the container, but do not come into contact with the walls of the same in their revolutions. These plates $f$ serve as bases for the counter cutting-blades F, which are arranged thereon at the proper intervals to pass between the blades D' on the frames D. On the third arm, $e$, of each sleeve

E E* is secured a long narrow scraper, G, which extends throughout the length of the container, and is provided with a sharp cutting-edge, $g$, that is in close contact with the walls of the container. The sleeve E, and consequently the counter cutting-blades and the scraper, are rotated, as shown in the drawings, in the same direction as the shaft, but at a lower rate of speed; but, if desired, the sleeve may be rotated in the opposite direction. In this example the rotation of the sleeve is effected by means of a belt-and-pulley connection with the counter-shaft $C^2$. The sleeve E* at the right-hand end of the drum can also be connected by pulleys and a belt with the counter-shaft $C^2$. The scraper G removes all the material which settles on the walls of the drum, and as it accumulates on the counter-blades F it is broken up by the action of the cutting-blades D'.

By rotating the two sets of blades and the scrapers in opposite directions or at different rates of speed, the contents of the container are kept constantly agitated, and are continually removed from the walls as they accumulate thereon and broken up by the blades. The residue after evaporation is thus left in the s... of a coarse dry powder in which all the properties of fresh milk are preserved, which can be kept for a comparatively long time without deterioration, which readily dissolves in water, tea, or coffee, and which can be packed up ready for the market in the state in which it leaves the evaporator.

I am aware that it has been proposed to produce a coarse-grained powder by heating a solution of a chemical substance and constantly stirring the same until the moisture has evaporated, and this, therefore, I do not claim.

What I claim as new, and desire to secure by Letters Patent, is—

The within-described process for producing a coarse dry powder composed of a mixture of milk and sugar, which process consists in mixing the milk with sugar in suitable proportions, and then evaporating the mixture to dryness $in\ vacuo$ at a temperature below 140° Fahrenheit under constant agitation and comminution.

In testimony whereof I have hereunto set my hand and seal in the presence of two subscribing witnesses.

ROBERT ELLIN. [L. S.]

Witnesses:
W. HAUFF,
E. F. KASTENHUBER.